(No Model.)
H. L. H. SCHROEDER.
LENS.
No. 554,737.  Patented Feb. 18, 1896.
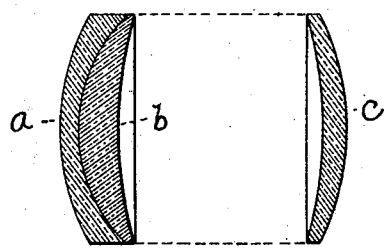
Witnesses
Norris A. Clark.
John R. Taylor.
Inventor
Heinrich L. H. Schroeder
By his Attorneys

UNITED STATES PATENT OFFICE.

HEINRICH L. H. SCHROEDER, OF NEW YORK, N. Y., ASSIGNOR TO THE MANHATTAN OPTICAL COMPANY, OF SAME PLACE.

LENS.

SPECIFICATION forming part of Letters Patent No. 554,737, dated February 18, 1896.

Application filed July 16, 1894. Serial No. 517,760. (No model.)

*To all whom it may concern:*

Be it known that I, HEINRICH L. H. SCHROEDER, a subject of the Queen of Great Britain, residing at New York city, in the county and State of New York, have invented a certain new and useful Improvement in Lenses, of which the following is a specification.

My invention relates to improvements in lenses of the class designed particularly for use in photographic cameras. The desideratum in lenses of this class is to produce an objective which shall be free from the various aberrations due to defects in the material used, the curvature of the elements, and their combination and arrangement relatively to each other. A further desideratum, and one of considerable importance in this art, is to produce such a lens at small expense, in order to permit their use in cameras of moderate cost. To this end photographic objectives have been devised consisting of a flint lens of a negative focus combined with a crown lens of a positive focus, this combination being approximately achromatic and forming the front of the objective, the back being formed by a simple lens of positive focus located at some distance from the front lenses. The system thus constructed can be made free from chromatic and spherical aberrations, but is faulty, owing to the presence of astigmatic aberrations which have not heretofore been avoided in objectives of this description.

The object of the present invention is to produce a simple inexpensive three-part lens or photographic objective, which shall not only be free from chromatic and spherical aberrations, but which shall be anastigmatic.

To this end I employ the system illustrated in the drawing. Here $a\, b$ designate two lenses, preferably, but not necessarily, cemented together. The lens $a$ may be composed of flint glass and has preferably a negative focus, while the lens $b$ may be of crown or other suitable glass and has preferably a positive focus. These lenses may be meniscuses, or their sides and degree of curvature may be varied, if desired. The refractive index of the lens $a$ is, however, greater than that of the lens $b$.

$c$ designates the back lens. This is a simple lens of positive focus, and may be arranged at some distance from the front lenses, $a\, b$. The lens $c$ is made of flint or crown glass, baryta glass, or dense baryta glass, and its refractive power is higher than that of the lens $a$.

The dispersive power of the three-part system thus constructed is such as to make the objective achromatic, while the spherical aberration is corrected in the usual manner.

I have found it desirable in constructing the objective above described to use the formulæ laid down by Professor Gauss, and by calculating the thickness of the lenses and their location relatively to each other for the purpose of a further correction of the aberrations the system can be made anastigmatic and will have a short focus.

I have found the following formula advantageous:

*Curves.*

Lens $a\, b$:
 $r = 2.374$ inches.
 $r^2 = 0.887$ inch.
 $r^3 = 3.192$ inches.

*Curves.*

Lens $c$:
 $r^4 = 2.936$ inches.
 $r^5 = 2.374$ inches.

*Diameter.*

$a = 1.617$ inches.
 $b = 1.350$ inches.
 $c = 1.617$ inches.

*Thickness.*

$a = 0.196$ inch.
 $b = 0.271$ inch.
 $c = 0.167$ inch.

*Glass.*

$a =$ No. 75, extra light flint.
 $b =$ No. 54, crown of high dispersion.
 $c =$ No. 57, baryta light flint.

I prefer to so construct the objective that the double lens, comprising the lenses $a\, b$, shall form the front. Under this condition the double lens will serve chiefly as a corrector for the simple back lens, $c$, which serves chiefly for forming the image. It is not, however, imperative that the double lens should form the front and the simple lens the back, as this arrangement may be reversed without sacrificing the advantages incident to the preferred form.

I claim—

1. An objective, comprising two lenses preferably combined, and a third lens of baryta glass having a refractive power higher than that of either or both of the other lenses, and separated from said other lenses, substantially as set forth.

2. An objective, comprising two single lenses, one of which has a higher refractive power than the other, and both together being chromatically and spherically over-corrected, and another single lens separated therefrom having a higher refractive power than either of said other lenses and so constituted and arranged relatively thereto as to correct spherical and astigmatic aberrations, substantially as set forth.

This specification signed and witnessed this 5th day of July, 1894.

HEINRICH L. H. SCHROEDER.

Witnesses:
S. O. EDMONDS,
W. PELZER.